United States Patent

Hinkel

[11] Patent Number: 5,806,644
[45] Date of Patent: Sep. 15, 1998

[54] FREEWHEELING IDLER WHEEL HUB

[75] Inventor: Rüdiger Hinkel, Röthlein, Germany

[73] Assignee: Fichtel & Sachs AG, Schweinfurt, Germany

[21] Appl. No.: 708,546

[22] Filed: Sep. 5, 1996

[30] Foreign Application Priority Data

Sep. 8, 1995 [DE] Germany ................ 195 33 151.6

[51] Int. Cl.$^6$ .................................................. F16D 41/07
[52] U.S. Cl. .......................... 192/45.1; 188/82.8; 60/345
[58] Field of Search .................. 192/3.23, 3.29, 192/3.34, 41 R, 45.1; 188/82.8; 60/341, 345, 362

[56] References Cited

U.S. PATENT DOCUMENTS

| | | | |
|---|---|---|---|
| 3,886,740 | 6/1975 | Krok | 60/341 |
| 4,875,564 | 10/1989 | Leitz et al. | 192/45.1 |
| 4,953,353 | 9/1990 | Lederman | 60/345 |
| 5,016,741 | 5/1991 | Leitz | 192/45.1 |
| 5,632,363 | 5/1997 | Kubo et al. | 192/45.1 |

FOREIGN PATENT DOCUMENTS

| | | |
|---|---|---|
| 0508564 | 10/1992 | European Pat. Off. . |
| 0549824 | 7/1993 | European Pat. Off. . |
| 2333276 | 1/1974 | Germany . |

Primary Examiner—Richard M. Lorence
Attorney, Agent, or Firm—Cohen, Pontani, Lieberman & Pavane

[57] ABSTRACT

An idler wheel hub with freewheel mechanism, which encompasses an inner freewheel ring and an outer freewheel ring. Located radially between the freewheel rings are an inner cage and an outer cage. These cages are provided with recesses so that clamping bodies can penetrate therein. The clamping bodies are directionally prestressed so as to be in contact with the freewheel rings. The axial extension of the components is limited by side plates, which are located between the freewheel rings, and the freewheel rings are in turn centered by the side plates. One of the side plates forms a single part with the outer cage of the freewheel mechanism. The second side plate locks securely into the outer cage of the freewheel mechanism. The plates are provided with axially outwardly arranged glide devices. At least one of the side plates is attached in a turn-proof manner relative to the outer freewheel ring.

15 Claims, 2 Drawing Sheets

FREEWHEELING IDLER WHEEL HUB

FIELD OF THE INVENTION

The invention relates to an idler wheel hub with freewheeling in one direction.

DESCRIPTION OF THE PRIOR ART

An idler wheel hub with freewheeling in one direction is already known from EP 508 564 This hub is made up of an inner and an outer freewheel ring. Between these freewheel rings there are clamping bodies, which are run from an inner and outer cage. A spring is located between the cages for prestressing the clamping blocks relative to the freewheel rings. If the freewheel rings are turned somewhat relative to one another, then, during this turning, the clamping blocks wedge themselves between the freewheel rings in one direction. As a result, the freewheel rings—and thus the idler wheel—are blocked. If the freewheel rings are turned relative to one another in the other direction, the existing blockage is lifted. The freewheel rings are freely turnable in this direction. During these procedures, the inner cage and outer cage are responsible for guiding the clamping blocks evenly relative to one another, in order to attain the most even possible engagement or release of the clamping blocks. The idler wheel is in the freewheeling mode. The components located between the freewheeling wheels are limited axially by lateral clamps. Caps center the outer ring relative to the inner ring, and thus establish a regular gap between the clamping areas. The caps are axially fixed in place by holding rings which lock into grooves that run radially on the inner side of the outer freewheel ring. A side cap can also be formed as a single component with the outer cage.

The idler-wheel hub has roller bearings arranged in the radial direction on the axial contact surfaces, as known, for example, from EP 549 824 A1. These roller bearings ensure that contact points glide easily against one another in the area of the bearings at different speeds of the pump, turbine and idler wheel.

It is disadvantageous in this design that multiple parts are needed to axially limit the components arranged in the radial direction between the freewheel rings. Furthermore, for antifriction purposes, roller bearings are needed in the axial limit area of the idler-wheel hub.

SUMMARY OF THE INVENTION

Accordingly, it is an object of the present invention to provide an idler wheel hub having a freewheel mechanism that is compact in structure and easy and economical to produce.

Pursuant to this object, and others which will become apparent hereafter, one aspect of the present invention resides in a free wheeling idler hub which encircles an inner free wheel ring, an outer free wheel ring and inner and outer cages. The cages are provided with recesses therein. Directional prestressed clamping bodies are provided as are spring means for holding the clamping bodies in contact with the free wheel ring so that the clamping bodies penetrate the recesses in the cages. Lateral clamps are provided so as to center the free wheel ring and axially limit the hub. The lateral clamps include side plates which have a glide device in an axially outer direction. The side plates are connected to one another and to the outer cage and at least one of the side plates is non-rotatable relative to the outer freewheel ring.

Because the side limit of the idler wheel hub is designed so that the side plates perform the function of the roller bearings as well as the function of the axial limit, a compact idler wheel hub is created. When a plastic is selected as the material to be used, it is possible for components, such as the side plates and outer cage, to be manufactured economically by injection technology. At least one of the side plates is provided with shoulders for centering the freewheel rings. The lock-in devices also form part of the side plates or the outer cage. A side plate forms a single part with the outer cage. The locking connection is established by means of lateral and frontal shapes, which lock into depressions provided for them. These lateral and frontal shapes can be located at different radial heights. The recesses can be produced by means of rods that are removed from the finished part after the injection process; specifically, the recesses in the axial direction can be produced by rods that are removed in the axial direction, while the lateral recesses can be produced by rods that are removed outwardly in the radial direction. This allows the parts to be simply and economically produced by injection technology.

The glide device that performs the function of the roller bearings is made up of glide bodies. Multiple glide bodies can be located on one side. Between the glide bodies there are grooves through which a pressure medium can flow. One result of this is that the idler wheel hub is always adequately lubricated with pressure medium, ensuring that the idler wheel hub runs easily. Furthermore, the converter interior can be supplied with pressure medium. Because of its compact design, this idler wheel hub is especially easy to handle, which is very advantageous during the manufacturing process.

It is also possible, however, to still provide accommodations for a roller bearing on at least one side plate.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
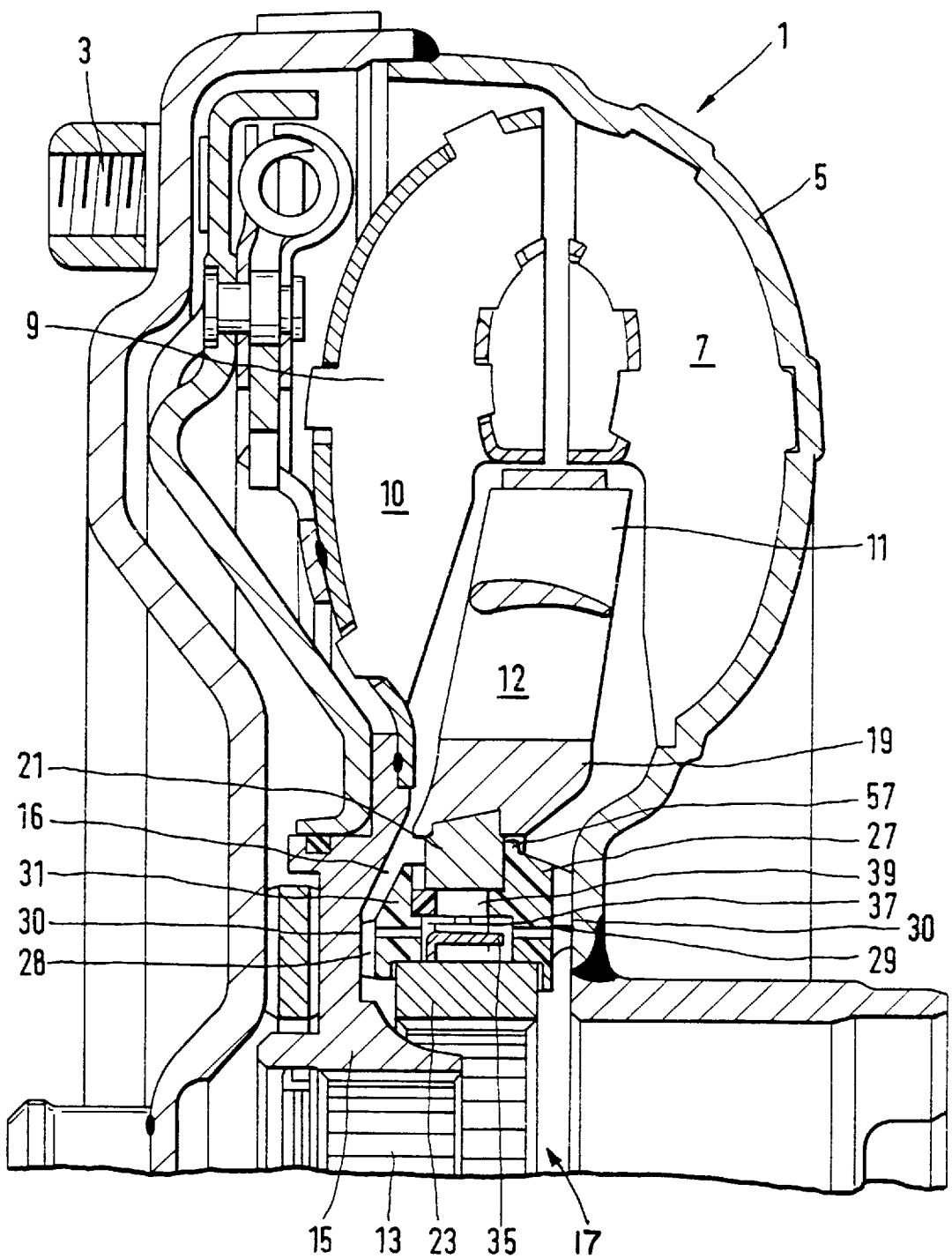
FIG. 1 shows the upper half of a section through a hydrodynamic torque converter with a bridge coupling.
Figure 2:
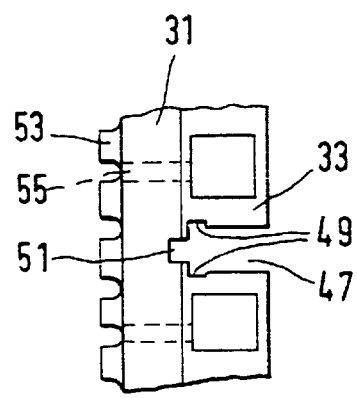
FIG. 2 is an enlarged top view of a side plate with an outer cage.
Figure 3:
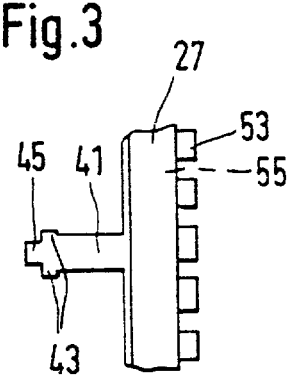
FIG. 3 is an enlarged view of the second side plate with a formed stud.

The hydrodynamic torque converter 1 shown in FIG. 1 is able to convert both torque and speed of a drive motor, in reference to a drive shaft of a turbine wheel 9. A pump wheel 7 is turned at motor speed via a work drive 3, which is connected to a converter housing 5 in a turn-proof fashion. As a result of the turning movement, the pressure medium between the blades of the pump wheel 7 is pushed outward by centrifugal force and makes its way at great speed to the turbine wheel 9. The turbine wheel 9 converts the flow energy of the pressure medium into a torque by diversion in the sharply-bent turbine-wheel blades 10. Between the turbine wheel 9 and the pump wheel 7 is an idler wheel 11 that sits on a freewheel mechanism 16. The idler wheel 11 is only able to turn in the same direction as the converter housing 5, i.e., as the motor. The pressure medium coming from the turbine wheel 9 encounters the idler wheel 11, which can be an aluminum casting 19. Because the idler wheel blades 12 are bent opposite to the flow direction of the pressure medium, and because the idler wheel 11 puts up resistance by means of the blocked freewheel mechanism 16, the flow of the pressure medium is diverted and resupplied at an advantageous angle to the pump wheel 7. This results in a torque conversion. The larger the speed difference between the pump wheel 7 and the turbine wheel 9, the larger this torque conversion will be. The torque conversion is thus greatest during start-up. As the speed of the turbine wheel 9 increases, the flow course becomes flatter and flatter, because the turning movement of the turbine wheel 9 is superimposed on the inflow direction of the pressure medium. As a result, the torque amplification declines in stepless fashion. As the speed difference between the pump wheel 7 and the turbine wheel 9 decreases, the flow course of the pressure medium changes to the extent that the pressure medium flows against the idler wheel blades 12 from the rear side. Now the idler wheel 11 also begins to turn in the same direction as the turbine wheel 9 and the pump wheel 7. The blocking effect of the freewheel mechanism 16 in one direction is thus ended.

Figure 4:
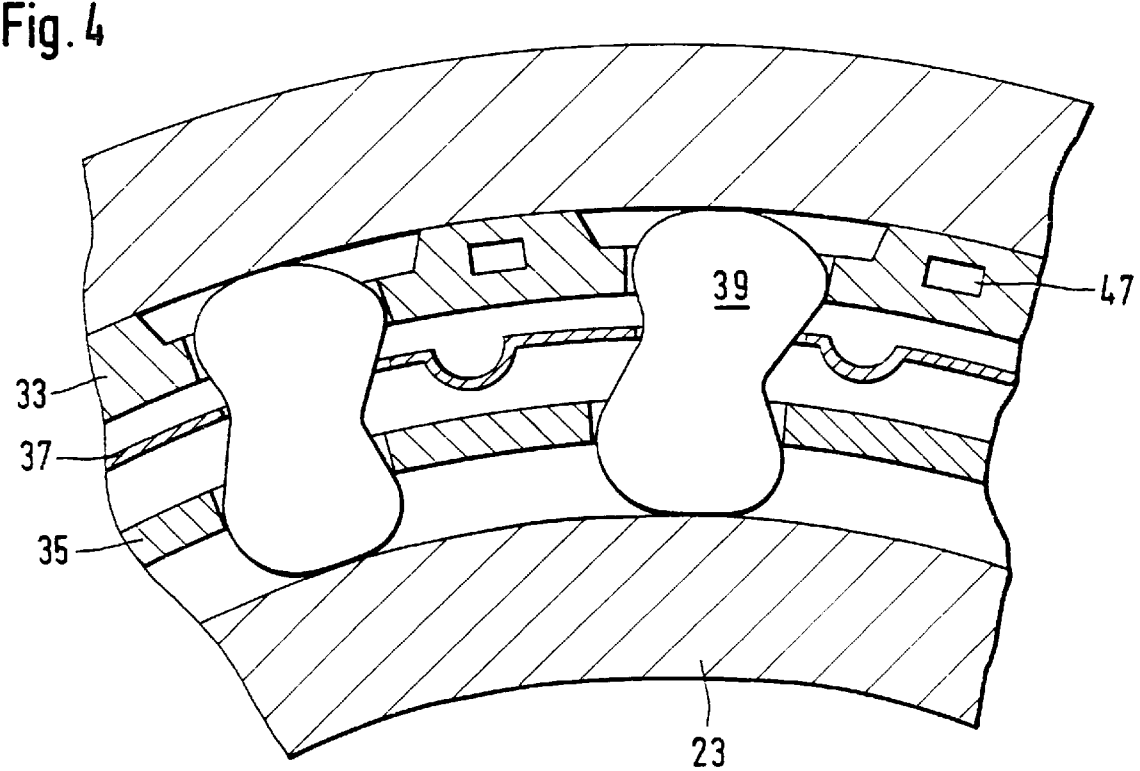
FIG. 4 is an enlarged section through the idler wheel hub.

The structure and operation of the idler wheel hub 17 will now be discussed in greater detail. The idler wheel hub 17 has axial contact areas 30 and encompasses an outer freewheel ring 21 and an inner freewheel ring 23. There are an outer cage 33 and an inner cage 35 located radially between the freewheel rings 21, 23. Located radially between these two cages 33, 35 is a spring 37, by means of which clamping blocks 39 are prestressed. As shown in FIG. 4, the cages 33, 35 and the spring 37 each have opening in which the clamping blocks 39 are arranged. The clamping blocks 39 are guided by the cages 33, 35. If a force acts counter to the turning direction of the pump wheel 7, then the damping blocks 39 wedge themselves between the freewheel rings 21, 23 in such a way that the freewheeling hub is prevented from turning. The glide bodies 53, which are in contact with the converter housing 5 or the turbine-wheel hub 15, prevent unnecessary losses that would occur as the result of different angular speeds of the pump wheel 7 and turbine wheel 9 and idler wheel 11. The turbine wheel hub 15 is mounted on the output shaft 13. If a torque acts in the rotational direction of the pump wheel 7, then the clamping blocks 39 are released, and the freewheel rings 21, 23 are freely turnable against one another in this direction. The idler wheel 11 is in the freewheeling mode. The cages 33, 35 are needed to hold and guide the clamping blocks 39. The idler wheel hub 17 is limited axially by two side plates 27, 31. One side plate 31 forms a single component with the outer cage 33. The other side plate 27 can be fixedly connected to this single component at 57. This positive-locking connection is established by means of the formed studs 41 of the side plate 27 and the recess 47 in the side plate 31. The studs have lateral shapes 43 that lock into radial depressions 49 in the side plate 31. Frontally, there is a pin 45 that locks into the axial depression 51. This pin 45 can be located at a different radial height than the lateral shapes 43. Not all of the formed studs 41 need to be provided with lateral 43 and frontal 45 attachment members. The side plates can have axially directed shoulders that define a circular shape so that the outer freewheel ring is centered relative to the inner freewheel ring.

A glide bearing device 28, 29 is axially outwardly arranged on each side plate 27, 31. The glide devices 28, 29 are made up of one or more glide bodies 53 with grooves. The side plates themselves have openings 55 through which the pressure medium can flow. This pressure medium provides good lubrication at all times and thus ensures the smooth running of the hub 17. In addition, this also makes it possible for pressure medium to be run through the freewheel mechanism 16, as may be necessary in certain application cases.

The invention is not limited by the embodiments described above which are presented as examples only but can be modified in various ways within the scope of protection defined by the appended patent claims.

I claim:

1. A freewheeling idler wheel hub, comprising:
   an inner freewheel ring;
   an outer freewheel ring;
   an inner cage;
   an outer cage, the cages being located radially between the freewheel rings and having openings therein;
   directionally prestressed clamping bodies;
   spring means located radially between the cages for holding the clamping bodies in contact with at least one of the freewheel rings so that the clamping bodies penetrate the openings in the cages;
   lateral clamps arranged to center at least one of the freewheel is and axially limit the freewheeling hub, the lateral clamps including two side plates which have a glide device in an axially outward direction, a first one of the side plates being nonrotatably fixed to the outer cage, the side plates being non-rotatable relative to the outer freewheel ring;
   and means for securely locking the side plates to the outer cage, the locking means including axially extending formed studs circumferentially distributed on a second one of the side plates so as to engage in recesses in one of the first side plate and the outer cage.

2. A freewheeling idler wheel hub as defined in claim 1, wherein the outer cage and the first one of the side plates are formed as a single component so that the single component is engagable with the second side plate via the formed studs.

3. A freewheeling idler as defined in claim 1, wherein at least one of the side plates has axial shoulders arranged to center the outer freewheel ring relative to the inner freewheel ring.

4. A freewheeling idler wheel as defined in claim 3, wherein the axial shoulders are configured so as to be circular.

5. A freewheeling idler wheel hub as defined in claim 1, wherein the side plates are made of plastic.

6. A freewheeling idler wheel hub as defined in claim 1, wherein at least one of the cages is made of plastic.

7. A freewheeling idler wheel hub as defined in claim 4, wherein the side plates are injection molded plastic parts.

8. A freewheeling idler wheel hub as defined in claim 1, wherein at least one of the formed studs has lateral projections.

9. A freewheeling idler wheel hub as defined in claim 1, wherein at least one of the formed studs has an end-side projection.

10. A freewheeling idler wheel hub as defined in claim 8, wherein the recesses are provided with depressions into which the lateral projections of the formed studs are engagable.

11. A freewheeling idler wheel hub as defined in claim 1, wherein a number of the formed studs are configured to radially prestress the outer cage against the outer freewheel ring.

12. A freewheeling idler wheel hub as defined in claim 1, wherein the glide device includes at least one glide body that is provided with grooves, the side plates being provided with at least one opening for a flow of pressure medium.

13. A freewheeling idler wheel hub as defined in claim 1, wherein at least one of the side plates is configured to be attachable to a roller-bearing.

14. A freewheeling idler wheel hub as defined in claim 1, and further comprising a pump wheel and a converter housing that encloses the pump wheel, the freewheel hub, the freewheel rings, the cages, the side plates and the glide device, the glide device being arranged so as to rest at least partially against the converter housing on a pump wheel side of the housing.

15. A freewheeling idler wheel hub as defined in claim 1, and further comprising a turbine wheel and an idler wheel, the glide device being arranged at the turbine-wheel so as to provide a glide contact at different speeds of the turbine wheel and the leading wheel.

* * * * *